United States Patent [19]

Hatanaka et al.

[11] Patent Number: 4,962,366
[45] Date of Patent: * Oct. 9, 1990

[54] AUTOMATIC TURN SIGNAL CANCELLING APPARATUS

[75] Inventors: Kaoru Hatanaka, Saitama; Yukio Miyamaru, Tokyo; Shigeo Kawada, Saitama, all of Japan

[73] Assignee: Honda Giken Kogyo Kabushiki Kaisha, Tokyo, Japan

[*] Notice: The portion of the term of this patent subsequent to Jan. 9, 2006 has been disclaimed.

[21] Appl. No.: 455,731

[22] Filed: Jan. 5, 1983

[30] Foreign Application Priority Data

Jan. 8, 1982 [JP] Japan .................................. 57-1427
Aug. 5, 1982 [JP] Japan ................................ 57-136732

[51] Int. Cl.$^5$ ............................................. B60Q 1/00
[52] U.S. Cl. ...................... 340/476; 340/477; 340/432
[58] Field of Search ....................... 340/56, 73, 55, 62, 340/81 R, 134; 200/61.27

[56] References Cited

U.S. PATENT DOCUMENTS 4,333,071 6/1982 Kira et al. ............................... 340/73

FOREIGN PATENT DOCUMENTS 0146437 11/1981 Japan ..................................... 340/73
2084413 4/1982 United Kingdom .................. 340/56

Primary Examiner—John W. Caldwell, Sr.
Assistant Examiner—Tyrone Queen
Attorney, Agent, or Firm—Irving M. Weiner; Joseph P. Carrier; Pamela S. Burt

[57] ABSTRACT

An automatic turn signal cancelling apparatus for a motorized cycle, in which a signal provided from a handlebar turning angle detector is accumulated in response to a signal provided from a travel distance detector, and the cancellation of turn signal is made on the basis of comparisons of such accumulated value and the output of the turning angle detector with respective preset values, whereby a more appropriate function of cancellation of turn signal can be achieved.

Further, by providing with a device for determining a turning angle center in accordance with signals from the turning angle detector and the travel distance detector, a more accurate function of cancellation of turn signal can be attained.

Moreover, an easier and more reliable operation is assured by providing a compact and functional operating switch assembly.

8 Claims, 11 Drawing Sheets

AUTOMATIC TURN SIGNAL CANCELLING APPARATUS

BACKGROUND OF THE INVENTION

1. Field of the Invention

The present invention relates to an automatic turn signal cancelling apparatus and more particularly to an automatic turn signal cancelling apparatus for motorized cycles, which apparatus comprises an electrical circuit.

2. Description of Relevant Art

Because the bodies of motorized cycles are banked when making a turn, their handlebar turning angle is relatively small, and their handlebars are apt to fluctuate because they are normally decelerated just before making a turn. As a result, it is necessary for an automatic turn signal cancelling apparatus to have a reference for correctly judging whether a handlebar turning angle produced is caused by an actual turn or by a mere fluctuation of the handlebar. To this end, it has been desired to provide an apparatus including an electrical circuit for distinguishing between a handlebar turning angle signal caused by a turn and a noise caused by fluctuation of a handlebar.

A further problem resides in that it is difficult to set exactly the center of a handlebar turning angle. Because the handlebar turning angle of a motorized cycle during travel is small as mentioned above, a deviation of the turning angle center greatly impairs the proper operation of an automatic turn signal cancelling apparatus. In motorized cycles, moreover, the turning angle center is in many cases different for each motorized cycle even in the manufacturing stage because of variations in size of the parts which constitute the steering portion. Further, even if the turning angle center could be set accurately in the manufacturing stage, it will be upset during vehicular travel or by disassembly and reassembly of the steering portion. For these reasons, it has been desired to provide an automatic turn signal cancelling apparatus having a mechanism for detecting an actual turning angle center during vehicular travel.

The present invention has been effected to meet the foregoing demands.

SUMMARY OF THE INVENTION

According to the present invention, there is provided an automatic turn signal cancelling apparatus for a motorized cycle having a handle for turning angle detector and means for electrically processing a signal provided from the turning angle detector when the motorized cycle makes a turn, detecting the end of the turn on the basis of a state of change of the turning angle and cancelling the turn signal upon such detection. The apparatus further includes a distance detector for detecting a travel distance and producing a pulse output, means for accumulating the output of the turning angle detector in synchronism with the output pulse from the travel distance detector, and a logical arithmetic means for deciding turn signal cancellation on the basis of a combination of an output signal from the turning angle detector and an output signal from the accumulation means.

The aforesaid logical arithmetic means holds the accumulation means in a reset state while the handlebar turning angle is below a first preset value and decides upon the turn signal cancellation if the handlebar turning angle is below the first preset value when the output of the accumulation means exceeds a second preset value.

The present invention further provides a turning angle center detecting device for an automatic turn signal cancelling apparatus in a motorized cycle, having a handlebar turning angle detector, a travel distance detector and means for storing as a turning angle center a handlebar turning angle obtained when the motorized cycle is travelling at a distance exceeding a reference distance value while maintaining changes of the handlebar turning angle within a preset range, such reference distance value changing according to travel states and becoming larger as the travel distance becomes longer.

It is an object of the present invention to provide an automatic turn signal cancelling apparatus capable of correctly distinguishing between a mere handlebar fluctuation and steering for an actual turn, so as to operate correctly.

It is another object of the present invention to provide an automatic turn signal cancelling apparatus capable of correctly discriminating between whether a turning of a handlebar is for an actual turn or not by using a handlebar turning angle signal and a travel distance signal.

It is a further object of the present invention to provide an automatic turn signal cancelling apparatus capable of affording a more accurate handlebar turning angle signal by using a turning angle center detecting device.

Preferred embodiments of the present invention will be described in detail hereinunder with reference to the accompanying drawings, from which further features, objects and advantages of the present invention will become apparent.

DETAILED DESCRIPTION OF THE INVENTION

Figure 1:
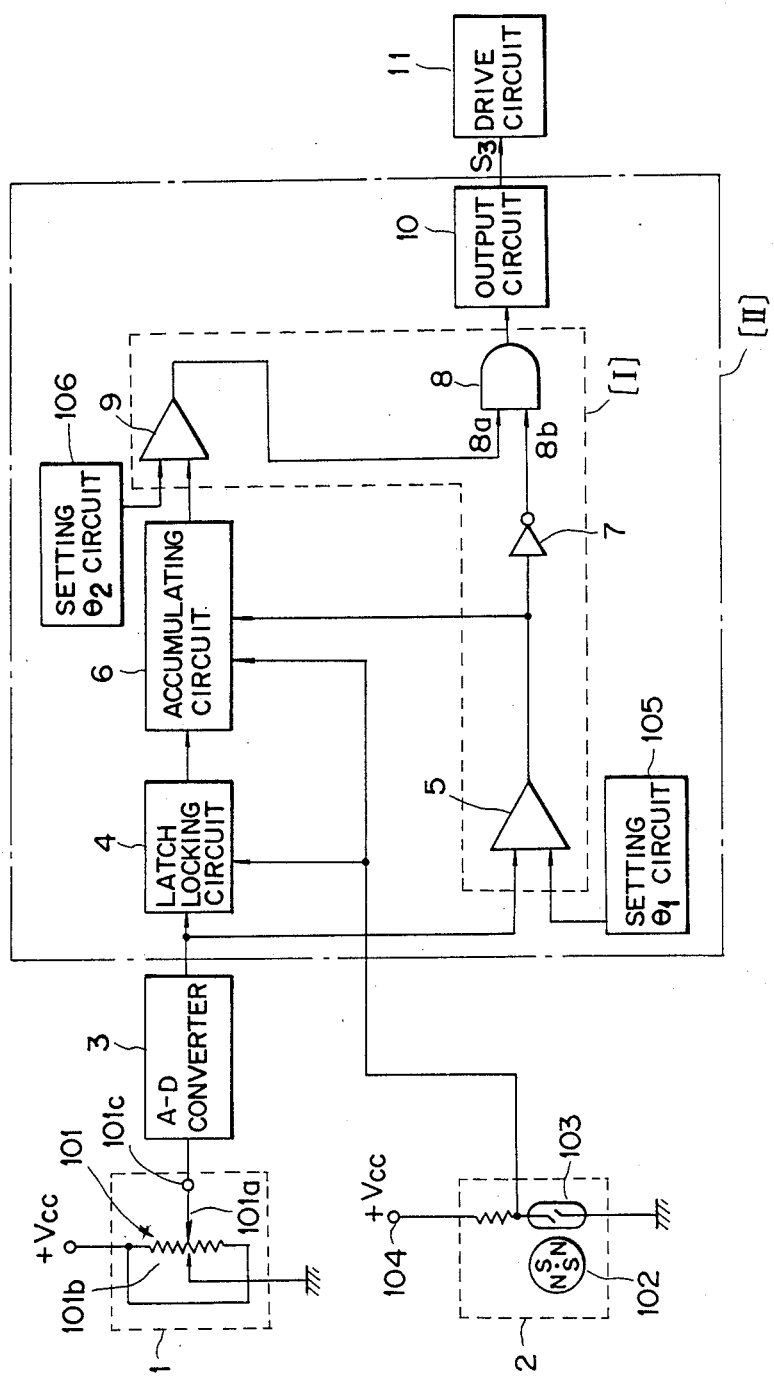
FIG. 1 is a block diagram of a signal processing electrical circuit in an automatic turn signal cancelling apparatus according to the present invention.

Referring first to FIG. 1, there is shown an electrical construction of an automatic turn signal cancelling apparatus according to the present invention, in which a principal portion of its mechanical construction is omitted. First, the circuit configuration and the function of each circuit element will be described below.

A handlebar turning angle detector 1 comprises a potentiometer 101, the output level of which changes continuously. In response to turning of a handlebar of a motorized cycle to the right and left with respect to the motorized cycle body, a contact needle 101a attached to a rotating shaft 101c deflects up and down on a resistor 101b to output a voltage corresponding to the handlebar turning angle. This embodiment is constructed so that the resistor 101b is grounded in its middle position and an equal voltage +Vcc is applied to each of the upper and lower resistor components. When the contact needle 101a is in the middle position, the handlebar is in a center position thereof and the turning angle detector 1 outputs an approximately zero voltage.

A distance detector 2 for detecting a vehicular travel distance comprises a rotor 102 which comprises a magnet adapted to rotate in interlocking cooperation with a wheel and a reed switch 103 disposed in proximity to the rotor 102. As the vehicle travels, the rotor 102 rotates and the resulting magnetic field turns on or off the reed switch 103 to produce a pulse output. A supply voltage Vcc is applied to a terminal 104.

An analog output from the turning angle detector 1 is fed to an A-D converter 3, where it is digitized, and then fed to a latch locking circuit 4. The latch locking circuit 4 receives the pulse signal output of the travel distance detector 2 and performs a latch locking operation according to the pulse signal received.

The handlebar turning angle signal which has been digitized by the A-D converter is also fed to a first comparator 5 through another path. The comparator 5, to which is fed in advance a first preset digital value $\theta_1$ from a setting circuit 105, compares the actual handlebar turning angle with the preset turning angle $\theta_1$, and when the former becomes larger than the latter, the comparator 5 outputs "1", while when the former is smaller than the latter, the comparator 5 outputs "0". The output of the comparator 5 is fed to an accumulating circuit 6 and also to one input terminal 8b of an AND circuit 8 through a NOT circuit 7.

The accumulating circuit 6 receives as a clock signal the pulse signal provided from the distance detector 2 and accumulates the handlebar turning angle signal which is provided from the latch locking circuit 4 at every input of the pulse. Provided, however, the accumulating circuit 6 is so constructed as to perform such operation only when it receives the signal "1" from the comparator 5; that is, it is so constructed as to operate only when the handlebar turning angle $\theta$ is larger than the preset value $\theta_1$. When the handlebar returns to its center position and the handlebar turning angle again becomes below the preset value $\theta_1$, the comparator 5 outputs "0" to reset the accumulating circuit 6.

The output of the accumulating circuit 6 is fed to a comparator 9 together with a second preset value $\theta_2$ provided from a setting circuit 106. The comparator 9 compares the magnitude between the accumulated value of handlebar turning angle and the preset value $\theta_2$, and when the former is larger than the latter, the comparator 9 outputs "1". In this sense, the preset value $\theta_2$ can be regarded as a reference for judging that the handlebar turning angle produced is caused by turn. The output of the comparator 9 is fed to another input terminal 8a of the AND circuit 8.

The output of the AND circuit 8 is fed to an output circuit 10, and when the AND circuit 8 outputs "1", a cancelling signal $S_3$ is provided from the output circuit 10 for operating a drive circuit 11, which turns off the blinker.

Figure 2:
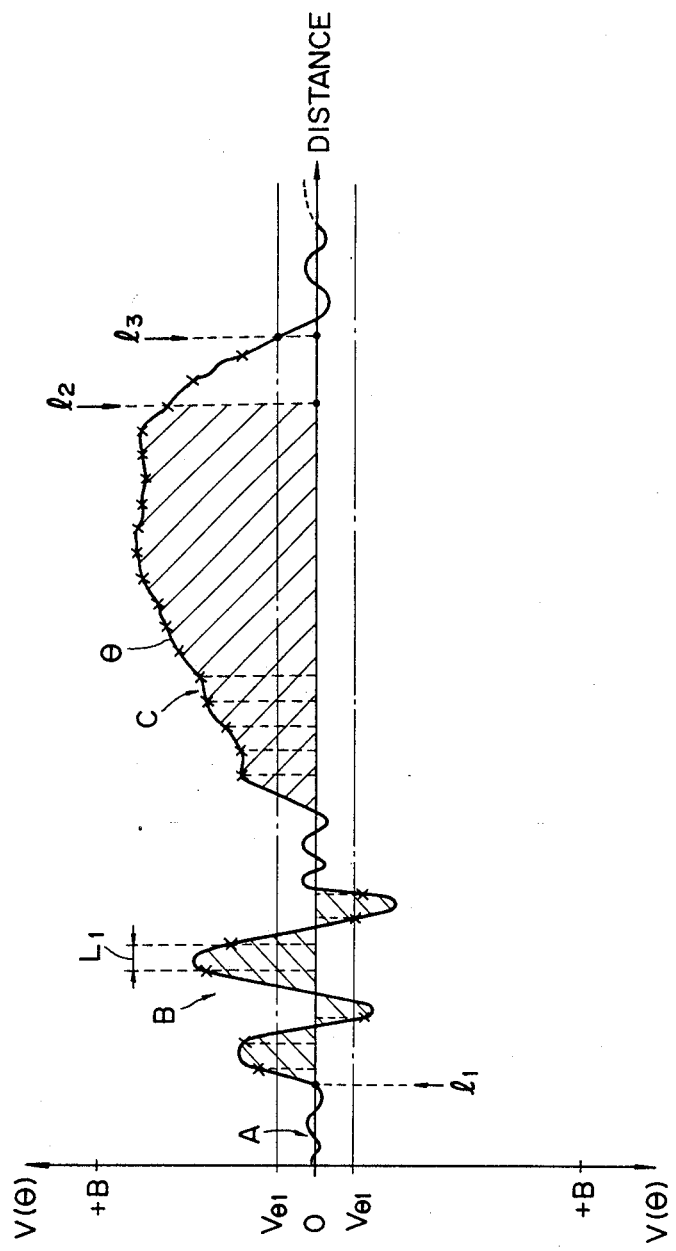
FIG. 2 shows exemplary of changes in output of a handlebar turning angle detector occurring when a motorized cycle makes a turn, for illustrating the operation of the electrical circuit.

Referring now to FIG. 2 for explaining the entire operation of the automatic turn signal cancelling apparatus described above, there is shown an exemplary changing state of the handlebar turning angle $\theta$ when making a turn, in which the output voltage of the turning angle detector 1 is plotted along the axis of ordinate and the travel distance is plotted along the axis of abscissa, and the output voltage shown above the axis of abscissa is with the handlebar turning angle directed to the left, while that shown below such axis is with the turning angle directed to the right.

In FIG. 2, the state indicated at A represents a straight travelling state before making a turn. At point $l_1$ a blinker switch is turned on to make a turn to the left. Because generally the vehicle is slowed down just before starting a turn, the handlebar fluctuates right and left as indicated at B FIG. 2. At this instant, the output of the turning angle detector 1 becomes larger than the preset value $V(\theta_1)$ (voltage value corresponding to the foregoing $\theta_1$), so that the accumulating circuit 6 starts operating; that is, at every generation of pulse from the travel distance detector 2 (the pulse is generated at every constant distance $L_1$), the accumulating circuit 6 receives the pulse as a clock signal and accumulates the value of the handlebar turning angle 8. The "x" mark in FIG. 2 indicate an accumulated handlebar turning angle. In the state of B, however, the accumulated value in the accumulating circuit 6 does not become larger than the preset value $\theta_2$ because the handlebar turning angle $\theta$ immediately drops below the preset value $\theta_1$, and as soon as the handlebar turning angle becomes below the preset value $\theta_1$ the comparator 5 produces a "0" output to reset the accumulating circuit 6. This operation is repeated in the state of B.

The state of C represents the state of handlebar turning angle when making a turn. In this state, an accumulated value of values (each marked "x" in FIG. 2) of turning angle $\theta$ becomes larger than the preset value $\theta_2$ at point $l_2$, so that the comparator 9 outputs "1" at point $l_2$. Thus, when the accumulated value in the accumulating circuit 6 exceeds the preset value $\theta_2$, it is judged that the vehicle is in a turning state.

When the handlebar turning angle $\theta$ becomes smaller than the preset value $\theta_1$ at point $l_3$, the comparator 5 provides a "0" output and the two inputs of the AND circuit 8 both become "1". The AND circuit 8 outputs "1" and a cancelling signal $S_1$ is put out from the output circuit 10 to turn off the blinker. Simultaneously with output of the cancelling signal, the accumulating circuit 6 is reset by the output "0" of the comparator 5, and the entire circuit reverts to the state before the turn. As will be understood from the above, the combination of the comparator circuits 5 and 9, NOT circuit 7 and AND circuit 8 constitutes a logical circuit means [I] for deciding cancellation.

Although in the above embodiment the circuit elements have each been described independently, they may be assembled as an ordinary circuit, or the circuit portion [II] shown in FIG. 1 may be constituted by a microcomputer, to simplify circuit configuration for judgment of turn based on the preset values and for the accumulating operation. In case the circuit is embodied by a microcomputer, an I/O connection circuit is provided between the microcomputer and each detector, drive circuit, etc.

Figure 3:
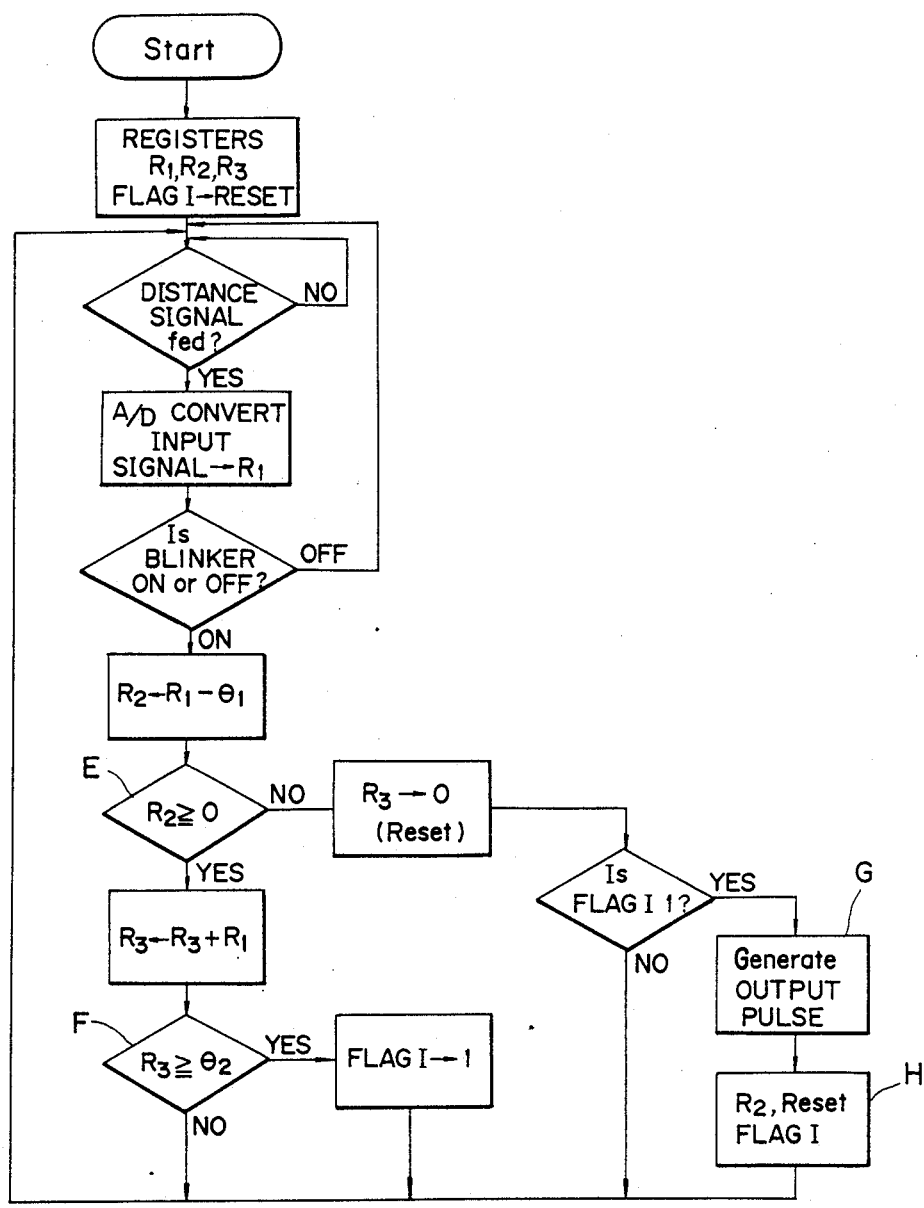
FIG. 3 is a flowchart showing an exemplary of operation of the apparatus of FIG. 1 as embodied by a microcomputer.

Referring now to FIG. 3, there is shown in the form of a flowchart an exemplary of operation of the apparatus of the present invention as constituted by a microcomputer, in which, for example, three registers $R_1$, $R_2$ and $R_3$ are used and the state of input to the AND circuit 8 from the comparator 9 is shown by a flag I. The register $R_1$ functions as the latch locking circuit 4, and the register $R_3$ receives an accumulated value from the accumulating circuit. In this flowchart, the judgment of E indicates the function of the comparator 5 and that of F indicates the function of the comparator 9. In the process G a cancelling signal is provided, and in the process H the state of the circuit is restored to the state before the turn. The details of flow are clearly shown in FIG. 3.

In the above embodiment, the preset value $\theta_1$ assumes a value of 1° or so, for example, and the preset value $\theta_2$ is decided appropriately in consideration of the actual state of turning.

According to another embodiment of the present invention, there is provided a turning angle center detecting device for attaining a more accurate operation.

Figure 4:
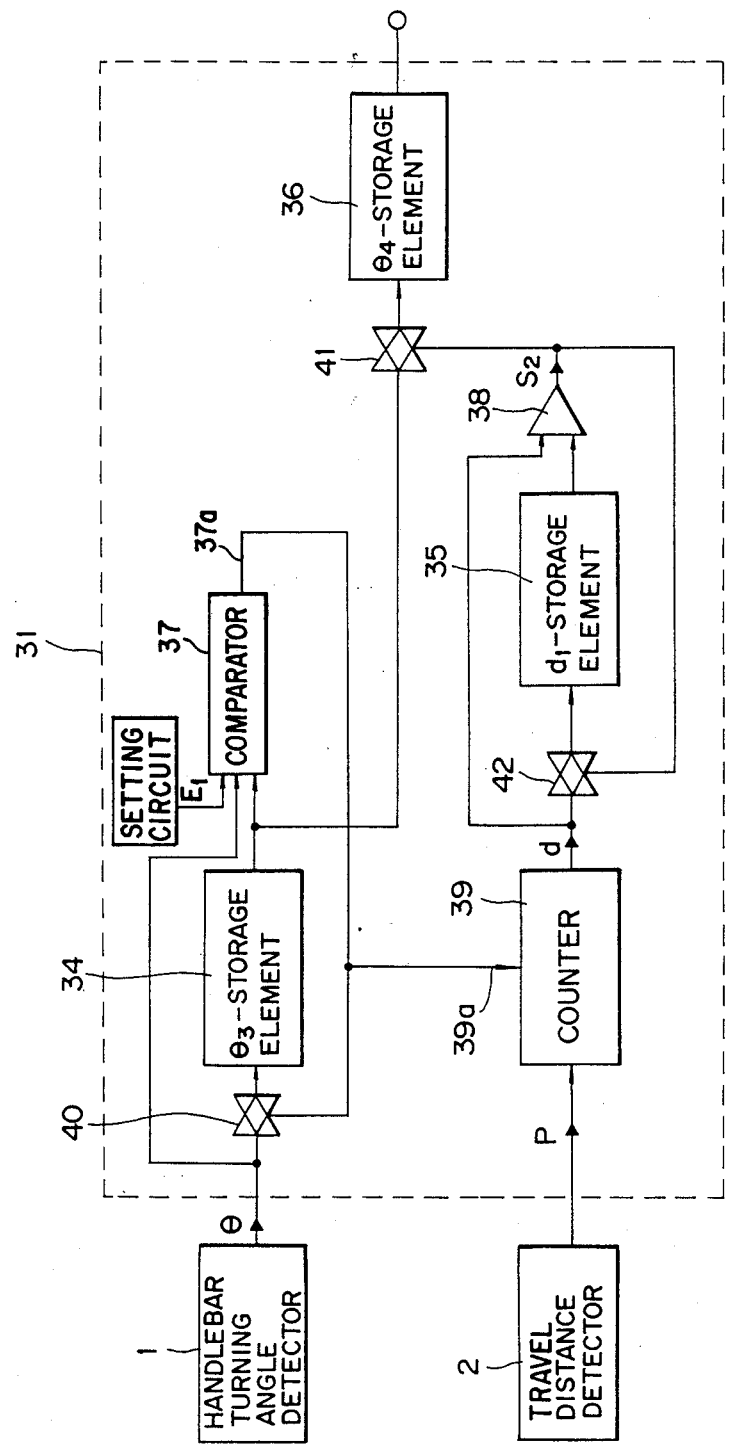
FIG. 4 is a circuit diagram of a first embodiment of a turning angle center detecting device according to the present invention.

In FIG. 4, which is a block diagram showing a basic construction of the turning angle center detecting device, block 31 shown in broken line denotes a turning angle center detecting circuit, and on the input side thereof are provided the handlebar turning angle detector 1 and the travel distance detector 2.

The turning angle center detecting circuit 31 comprises of three storage elements 34, 35 and 36; two comparators 37 and 38; and a counter 39. For the storage elements 34, 35 and 36, a capacitor which performs storage by charging may be employed. The turning angle center detecting circuit 31 is arranged as follows. The output terminal of the handlebar turning angle detector 1 is connected to an input terminal of the storage element 34 through a switch 40 (e.g. a semiconductor switch or a bilateral switch) adapted to be turned on and off with a separately supplied signal, and is also connected directly to one input terminal of the comparator 37. The output terminal of the storage element 34 is connected to the other input terminal of the comparator 37 and also to an input terminal of the storage element 36 through a switch 41 which functions in the same manner as the switch 40. On the other hand, the output terminal of the travel distance detector 2 is connected to an input terminal of the counter 39, which counts signals fed from the distance detector 2 to determine the vehicular travel distance. The counter 39 has a reset terminal 39a, to which is connected an output terminal 37a of the comparator 37. An output signal $s_1$ from the comparator 37 is also fed to a control terminal of the switch 40, which turns on when the output of the comparator 37 is at high level and turns off when the comparator output is at low level. The output terminal of the counter 39 is connected to an input terminal of the storage element 35 through a switch 42 which operates in the same manner as the switches 40 and 41, and is also connected directly to one input terminal of the comparator 38. To the other input terminal of the comparator 38 is connected the output terminal of the storage element 35. An output signal $s_2$ from the comparator 38 is fed to control terminals of the switches 41 and 42, and in the same manner as in the aforesaid relation between the comparator 37 and the switch 40, the switches 41 and 42 are turned on or off according to the state of the output signal $s_2$. The output of the storage element 36 is taken out as the output of the turning angle center detecting circuit 31.

Operation of the turning angle center detecting circuit 31 having the above circuit configuration will be described below with reference to FIG. 5.

When the ignition switch is turned on to start engine operation and the vehicle begins to move, the vehicular electric system is supplied with power and assumes an active state. In this state, the handlebar turning angle detector 1 outputs a relative positional change between the handlebar and the vehicle body in terms of an electrical analog signal $\theta$, which output level changes continuously, while the travel distance detector 2 outputs a pulse train signal P as the vehicle moves. The output signal $\theta$ appears as a signal which increases or decreases according to whether the handlebar is turned to the right or left, as shown in FIG. 5. The value of the signal $\theta$ at the time the handlebar is at its accurate center position is indicated by a reference character $\theta_0$ in FIG. 5.

Figure 7:
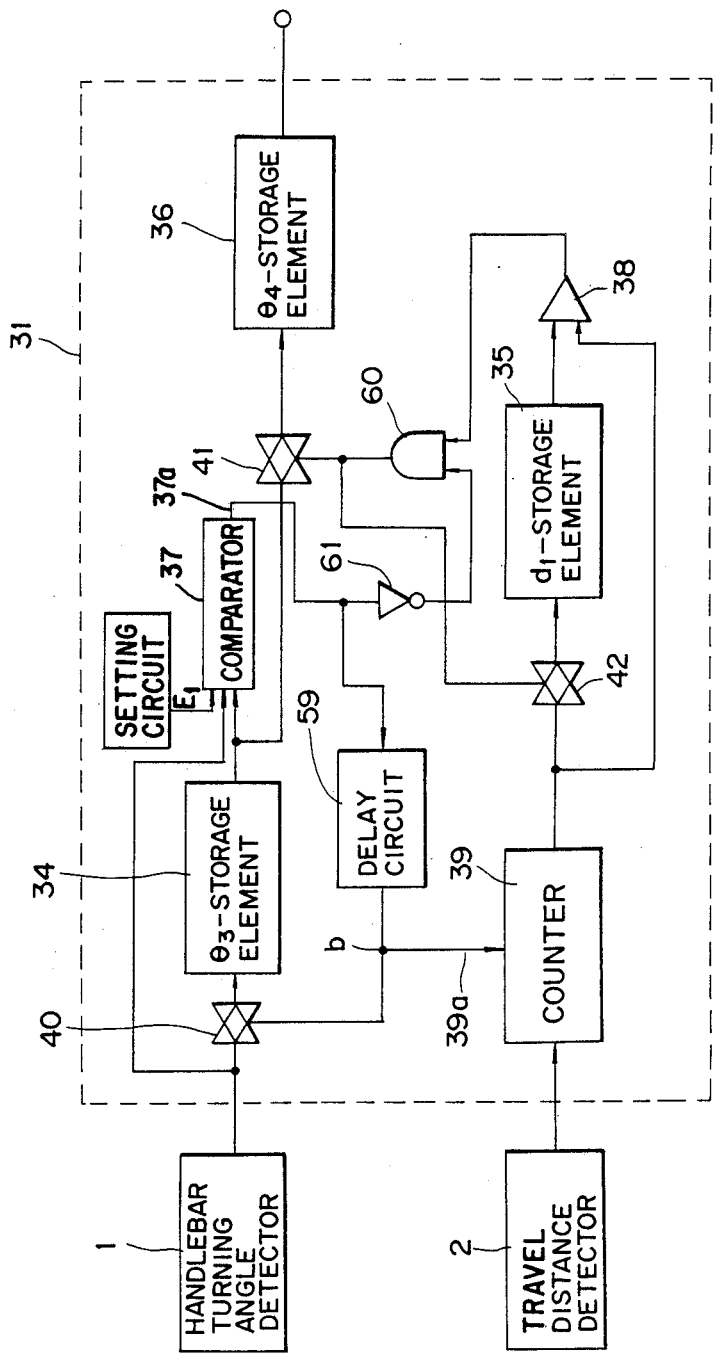
FIG. 7 is a circuit diagram of a second embodiment of a turning angle center detecting circuit according to the present invention.

Assuming that a turning angle value of $\theta_3$ is stored in the storage element 34 as an initial state, $\theta$ and $\theta_3$ are fed to the two input terminals of the comparator 37, which compares their magnitudes. The comparator 37 operates to assume an output state of low level if $|\theta - \theta_3| \leq \epsilon_1$ ($\epsilon_1$ is a preset value fed to comparator 37 from a setting circuit as shown in FIGS. 4 and 7) and an output state of high level if $|\theta - \theta_3| > \epsilon_1$. In case the output of the comparator 37 is in a state of low level, the switch 40 is off, the contents of the storage element 34 are unchanged, and the counting operation of the counter 39 is continued without being reset. If the input of the comparator 37 becomes $|\theta - \theta_3| > \epsilon_1$ and its output becomes high level, the switch 40 is turned on, the contents of the storage element 34 are changed to a new value (also expressed as $\theta_3$) provided from the turning angle detector 1, and the counter 39 is reset by the input signal 39a and immediately starts counting the signal output of the travel distance detector 2 again. When the contents $\theta_3$ of the storage element 34 assume a new value, the input of the comparator becomes $|\theta - \theta_3| > _1$, and the output of the comparator 37 immediately assumes the state of low level.

The counter 39, as mentioned above, receives and counts the pulse train signal P provided from the travel distance detector 2. The counter 39 outputs the count value d which corresponds to the distance traveled from the start of the counting by the counter 39. The count value d of the counter 39 is stored in the storage element 35 under a predetermined condition as explained hereinbelow. The stored value $d_1$ in the storage element 35 and the count value d are fed to the comparator 38 which compares the magnitude between the count value d and $d_1$. The comparator 38 operates to assume an output state of low level if $d-d_1<0$ and an output state of high level if $d-d_1>0$. When the output of the comparator 38 is in a state of low level, the switches 41 and 42 are off, and when it is at a high level, the switches 41 and 42 are on. When the switch 42 is turned on, the contents of the storage element 35 are changed to a new value (also expressed as $d_1$) provided from the counter 39, while when the switch 41 is turned on, the contents $\theta_3$ of the storage element 34 are transferred to the storage element 36 and stored therein as 04, which is regarded as a center value of the handlebar turning angle. When the contents of the storage element 35 assume a ne value and the counter 39 is then reset by the input signal 39a and the relation of the count value d and the stored value $d_1$ becomes $d-d_1<0$, the output of the comparator becomes low level and the switches 41 and 42 are turned off.

According to the hereinabove described basic operation, first using the storage element 34 and the comparator 37, when the output signal $\theta$ from the handlebar turning angle detector 1 undergoes a large change beyond the preset value $\epsilon_1$ with respect to the value $\theta_3$ which has previously been stored in the storage element 34, the contents of the storage element 34 are immediately changed to a value corresponding to that change, and simultaneously the counter 39 is reset by the input signal 39a, and starts counting again. Then, when the count value d of the counter 39 becomes larger than the maximum count value $d_1$ stored in the storage element 35 and counted up to that time, the contents of the storage element 35 are changed to the new maximum value, namely, the aforesaid count value d, by means of the storage element 35 and the comparator 38, and at the same time the contents of the storage element 36 are changed to the contents of the storage element 34 at that time. The contents of the storage element 35 are continued to be changed until the counter 39 is reset by the input signal 39a, and the value of d just before reset is stored as a new value of $d_1$. That is, after the vehicle starts moving, each time a stable travel state which satisfies the condition $|\theta-\theta_3|<\epsilon_1$ is repeated, each stable travel distance is counted by the counter 39 and the maximum distance among them is stored in the storage element 35, and at the same time the contents of the storage element 34 are stored as a turning angle center in the storage element 36.

Figure 5:
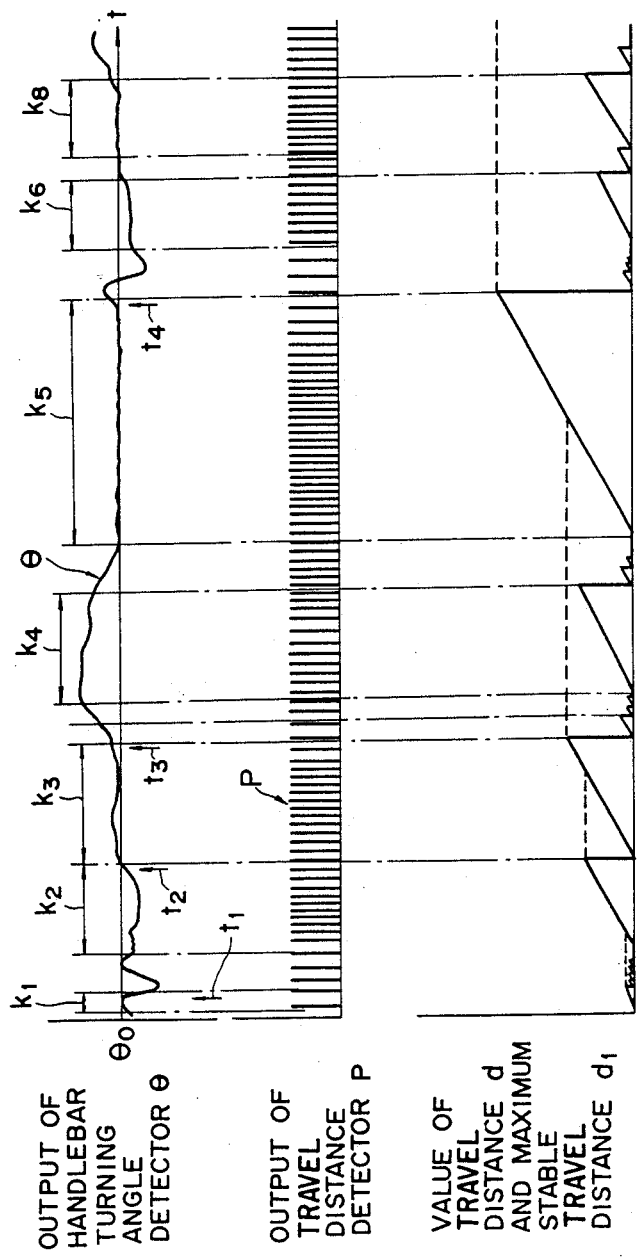
FIG. 5 is a graph showing an exemplary of output state of a handlebar turning angle detector in a travel state of a motorized cycle and also showing in this state the output of a travel distance detector as well as an accumulated value of travel distance and a maximum stable travel distance.

Therefore, in case there is produced the output signal $\theta$ from the handlebar turning angle detector 1 in such a state as shown in FIG. 5, there occur a plurality of stable sections $k_1$ through $k_8$ which satisfy the condition $|\theta-\theta_3|\leq\epsilon_1$ over the entire period illustrated. Each time a stable section longer than the previous one is detected, the contents (count number of pulse P) of the storage element 35 are changed like 2 (section $k_1$)→10 (section $k_2$)→14 (section $k_3$)→28 (section $k_5$), and at every such change (at each of points $t_1$, $t_2$, $t_3$ and $t_4$) the center value of the handlebar turning angle stored in the storage element 36 is changed Thus, the longer the vehicle travels, the more accurate can the center value be determined on the basis of a more stable straight travel state.

An embodiment of an automatic turn signal cancelling apparatus provided with the above-described turning angle center detecting circuit 31 will now be described with reference to FIG. 6.

Figure 6:
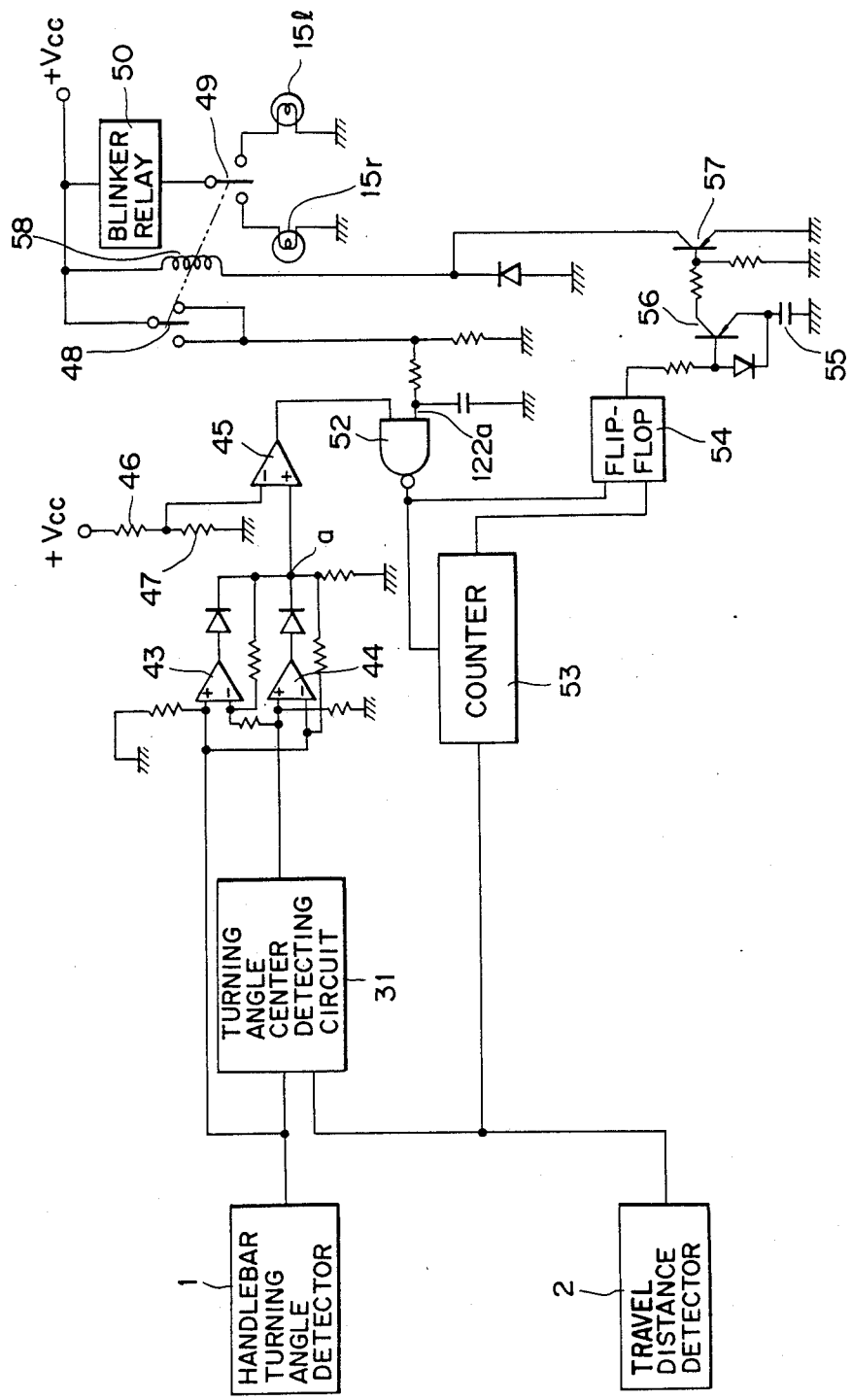
FIG. 6 is a circuit diagram of a first embodiment of an automatic turn signal cancelling apparatus provided with a turning angle center detecting device according to the present invention.

In FIG. 6, to the turning angle center detecting circuit 31 are fed the output signals from the handlebar turning angle detector 1 and travel distance detector 2. The output signal representative of a center value provided from the turning angle center detecting circuit 31 is fed to one of the input terminals as shown of differential amplifiers 43 and 44, while to the other terminal of the differential amplifiers 43 and 44 is fed the output signal from the turning angle detector 1. A handlebar turning angle is taken out as a voltage signal by the differential amplifiers 43 and 44 and fed to a plus terminal of a comparator 45, which provides a high level output if the voltage value corresponding to the turning angle is larger than a voltage value set by resistors 46 and 47, and provides a low level output if the former value is smaller than the latter In a straight travel state, therefore, the output of the comparator 45 assumes a low level.

If the driver turns on a blinker switch 48 to either the right or left to indicate a change in course, a switch 49 is turned on interlocking cooperation therewith to operate a blinker relay 50, whereby either a blinker lamp 15r or 15l blinks. When the switch 48 is thus turned on, an input terminal 52a of a NAND circuit 52 assumes a state of high level.

When the blinker switch 48 is turned on and the vehicle moves straight ahead, the output voltage of the differential amplifiers 43 and 44 is lower than the voltage set by the resistors 46 and 47, therefore the output of the comparator 45 is in a state of low level, and consequently the NAND circuit 52 provides a high level output and maintains a counter 53 in an inactive state. As the vehicular advancing direction begins to change, a voltage corresponding to a turning angle is produced at such point by either the differential amplifier 43 or 44 on the basis of a turning angle center determined by the turning angle center detecting circuit If this voltage becomes larger than the voltage set by the resistors 46 and 47 which are provided as a dead zone, the output of the comparator 45 assumes a state of high level, whereupon the output of the NAND circuit 52 becomes low and renders the counter 53 active. The counter 53 now in an active state counts the pulse signal provided from the travel distance detector 2, and after counting a predetermined number of pulses, it produces an output signal to operate a flip-flop 54, which in turn produces a high level output, thereby allowing a capacitor 55 to be charged. When the vehicle again assumes a straight travel state after completion of change of its course, the output of the comparator 45 becomes low level, so that the output of the NAND circuit becomes high, whereby the counter 53 is rendered inactive and the output of the flip-flop is brought into low level. Consequently, a transistor 56 is rendered conductive by the terminal voltage of the capacitor 55 and a transistor 57 is thereby rendered conductive, and the resulting current flow in a solenoid causes the blinker switch 48 and the switch 49 to return to the respective positions thereof before operation. Thus, the blinker operated as described above is turned off.

Although in the above embodiment the turning angle center detecting circuit 31 has been described applied to an automatic turn signal cancelling apparatus, it will be understood that it is not limited thereto and is applicable to various other apparatus which require the turning angle center.

Modified embodiments of a turning angle center detecting circuit according to the present invention will be described below, in which the same elements as in the above embodiment are indicated by the same reference numerals.

Referring to FIG. 7, there is shown a second embodiment of a turning angle center detecting circuit, in which a delay circuit 59 is inserted between the output terminal 37a of the comparator 37 and a point b which is connected to the reset terminal 39a of the counter 39 and also to the control terminal of the switch 40, and an AND circuit 60 is provided. The AND circuit 60 has two input terminals, to one of which is connected the output terminal of the comparator 38, while to the other is connected the output terminal of the comparator 37 through a NOT circuit 61, and the output terminal of the AND circuit 60 is connected to the control terminals of the switches 41 and 42. The counter 39 or comparator 38 comprises a circuit which undergoes a delay of operation, and by this configuration it is possible to avoid the inconvenience of having the switch 40 and the switches 41, 42 simultaneously turned on, even where such a likelihood exists.

Figure 8:
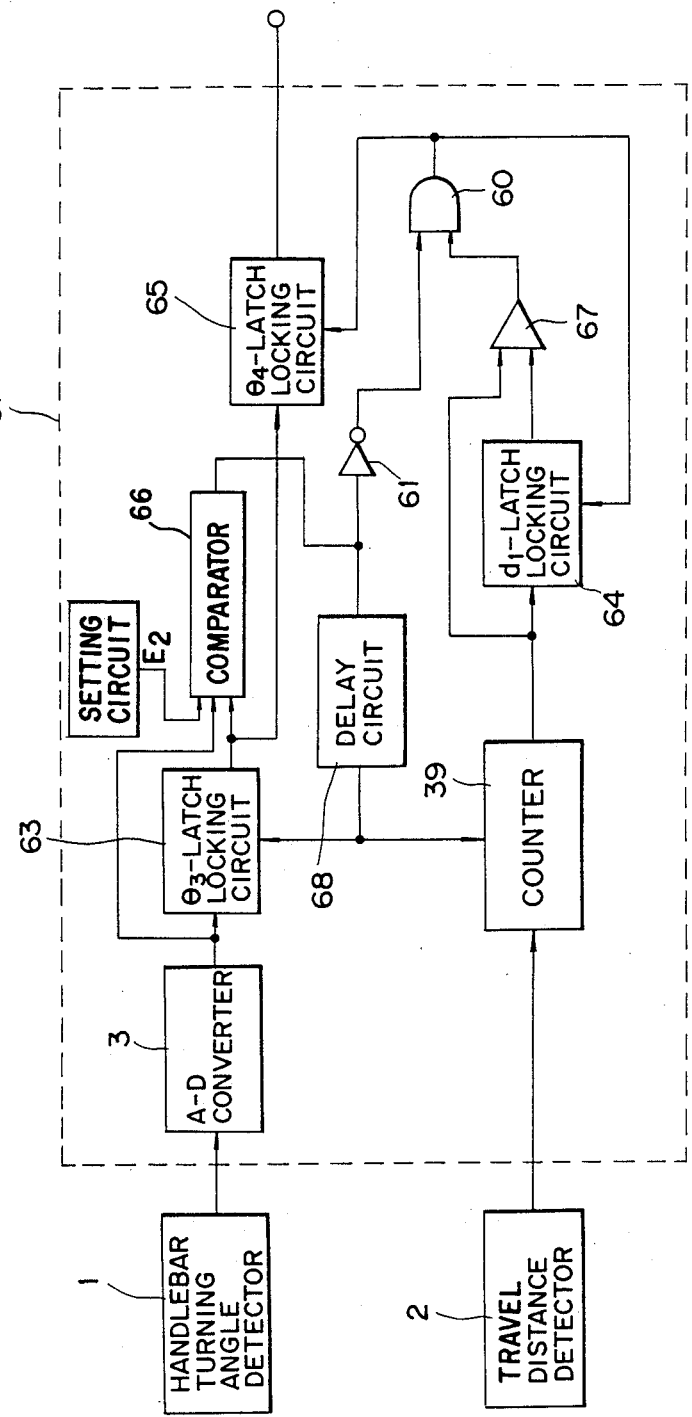
FIG. 8 is a circuit diagram of a third embodiment of a turning angle center detecting circuit according to the present invention.

Referring now to FIG. 8, there is shown a third embodiment of a turning angle center detecting circuit, which circuit results from modification of the circuit of the second embodiment described above so that the processing can be performed with a digital signal. To this end, an A/D converter is added, and latch locking circuits 63, 64 and 65 are used for the foregoing storage elements 34, 35 and 36. Further, comparators 66, 67 and delay circuit 68 of a digital type are used. The turning angle detecting circuit according to this embodiment can be arranged so that the outputs of the comparators 66 and 67 are fed directly to the latch locking circuits 63, 64 and 65. Consequently, it becomes unnecessary to provide the switches 40, 41 and 42 which were used in the foregoing embodiments, thereby permitting simplification of the circuit configuration and reduction in the number of parts.

Figure 9:
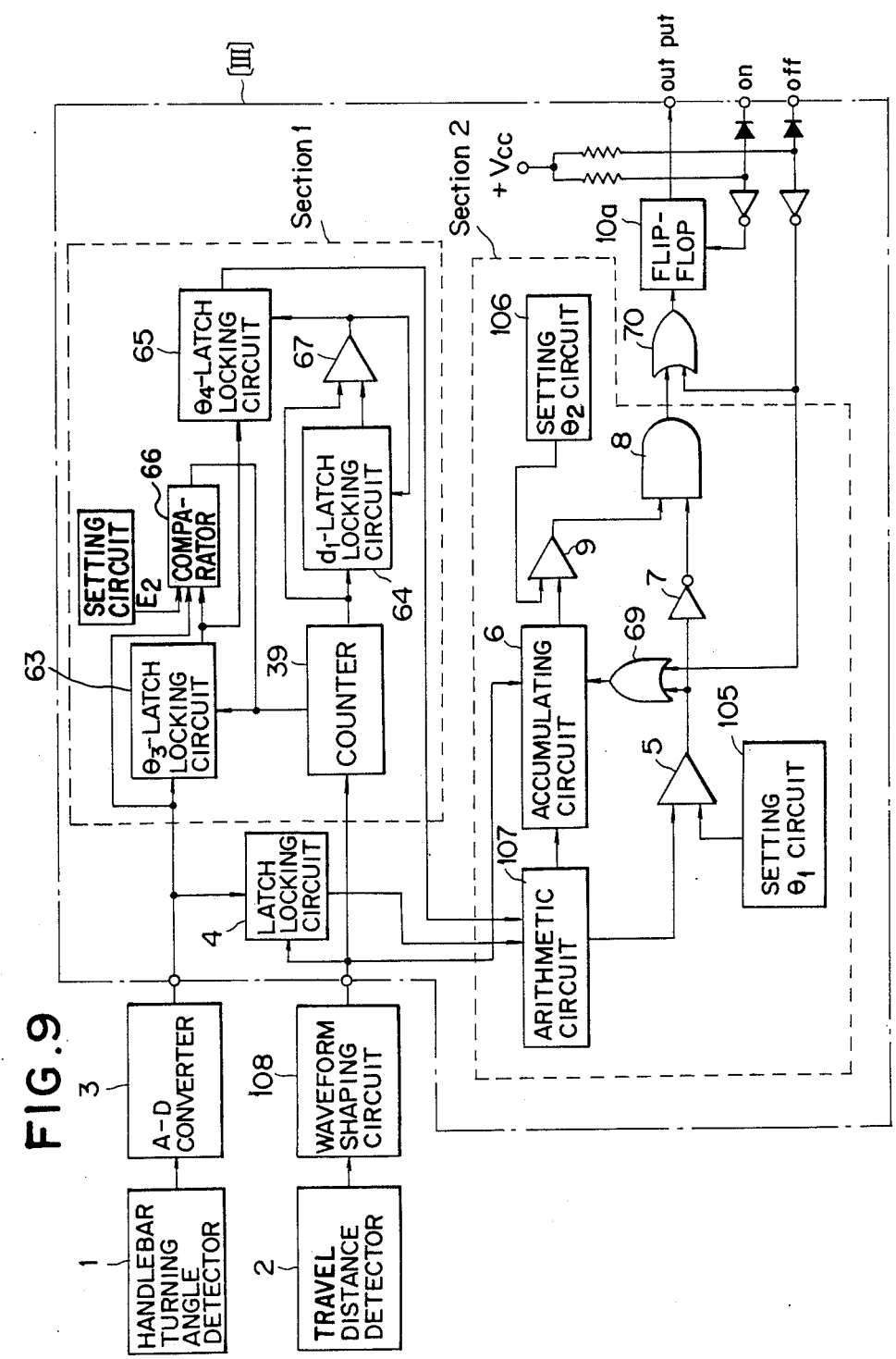
FIG. 9 is a circuit diagram of a principal portion of a second embodiment of an automatic turn signal cancelling apparatus provided with a turning angle center detecting circuit according to the present invention.

Referring now to FIG. 9, there is shown a principal circuit portion of a second embodiment of an automatic turn signal cancelling apparatus incorporating a turning angle center detecting device, in which Section 1 surrounded with broken line constitutes a turning angle center detecting circuit, and Section 2 also surrounded with broken line constitutes a turn signal cancelling circuit. An analog output provided from the handlebar turning angle detector 1 is fed to the A-D converter 3 and thereby digitized. This digital output $\theta$ is fed to the latch locking circuit 63 and comparator 66 in the turning angle center detecting circuit and also to the latch locking circuit 4 for providing an input to the turn signal cancelling circuit 1. To the comparator 66 is fed an output $\theta_3$ of the latch locking circuit 63. Also fed to the comparator 66 is a preset value $\epsilon_2$ from a setting circuit as shown in FIGS. 8 and 9. The value $\epsilon_2$ fed to the comparator 66 corresponds to the value $\epsilon_1$ fed to comparator 37, mentioned above. The comparator 66 operates to provide a "0" output if $|\theta-\theta_3|\leq\epsilon_2$ and a "1" output if $|\theta-\theta_3|>\epsilon_2$. The output of the comparator 66 is fed to the latch locking circuit 63 and counter 39. When the output of the comparator 66 is "0", the value $\theta_3$ latched in the latch locking circuit 63 is held, and the counter 39 continues to perform its counting operation. When the output of the comparator 66 changes to "1", the latch locking circuit 63 latches as $\theta_3$ the value of $\theta$ at that instant, and the counter 39 is reset.

A pulse signal provided from the travel distance detector 2 is shaped in waveform by a waveform shaping circuit 108 and fed to the latch locking circuit as a trigger signal, to counter 39 in the turning angle center detecting circuit as a signal to be counted and further to the accumulating circuit 6 as a trigger signal for starting the accumulating operation. The count value d from the counter 39 is fed to the comparator 67 and latch locking circuit 64. The comparator 67 further receives the output of the latch locking circuit 64, which output is the count value latched therein under a predetermined condition, as described hereinbelow, and is used correspondingly to the count value $d_1$ stored in the storage element 35 in the circuit in FIG. 4 mentioned above. Therefore, the latched value in the latch locking circuit 64 is also represented by $d_1$. The comparator 67 operates to provide a "0" output if $d-d_1<0$ and a "1" output if $d-d_1>0$. The output of the comparator 67 is fed to the latch locking circuit 64 and also to the latch locking circuit 65 which functions to latch a detected turning angle center value $\theta_4$. The latch locking circuit 65 further receives the output $\theta_3$ of the latch locking circuit 63. When the comparator 67 provides a "0" output, the values latched in both latch locking circuits 64 and 65 are held as they are, but when the comparator 67 provides a "1" output, the latch locking circuit 64 latches as $d_1$ the output d of the counter 39 at that instant, while the latch locking circuit 65 latches as $\theta_4$ the output $\theta_3$ of the latch locking circuit 63 at that instant.

The effect attained by the above configuration is as already mentioned in connection with FIG. 5. The turning angle center value $\theta_4$ thus detected is fed to an arithmetic circuit 107, to which is also fed the steering angle value $\theta$ from the latch locking circuit 4. The arithmetic circuit 107 performs the operation $\theta_5=\theta-\theta_4$ whereby there is obtained a more accurate turning angle value $\theta_5$ which is based on the detected turning angle center. The output of the arithmetic circuit 107 is fed to the accumulating circuit 6 as a signal to be accumulated and also to the comparator 5 for comparison with a first preset value $\theta_1$ fed from a setting circuit 105. The comparator 5 operates to provide a "0" output if $|\theta_5|<|\theta_1|$ and a "1" output if $|\theta_5|>|\theta_1|$. The output of the comparator 5 is fed to the accumulating circuit 6 through an OR circuit 69. When the OR circuit 69 provides a "1" output, the accumulating circuit 6 is in a reset state. To another input terminal of the OR circuit 69 is fed a turn signal cancelling pulse signal by manual operation. When the OR circuit 69 provides a "0" output, the accumulating circuit 6 accumulates the output $\theta_5$ of the arithmetic circuit 107 at every input of output pulse from the filter circuit 108, and the accumulated value $\theta_6$ is fed to the comparator 9. To another input terminal of the comparator 9 is fed a second preset value $\theta_2$ from a setting circuit 106, and the comparator 9 provides a "0" output if $|\theta_6|<|\theta_2|$ and a "1" output if $|\theta_6|>|\theta_2|$. The output of the comparator 5 is fed to the AND circuit 8 through NOT circuit 7, while that of the comparator 9 is fed to the AND circuit 8 directly. The output of the AND circuit 8 is connected through an OR circuit 70 to the reset terminal of the output circuit 10a which is constituted as a flip-flop circuit. To another input terminal of the OR circuit 70 is fed a turn signal cancelling pulse signal by the above-mentioned manual operation, and to the set terminal of the output circuit 10a is fed to a pulse signal for starting the operation of the blinker. The output of the output circuit 10a changes to "0" when its reset terminal receives a signal and changes to "1" when its set terminal receives a signal.

The effect attained by the above-described turn signal cancelling circuit is as already described in connection with FIG. 2. Particularly in this embodiment, the change in output of the output circuit 10a from "1" to "0" is used as a cancelling signal. Although only a principal circuit portion of this embodiment is shown in FIG. 9, the circuit configuration of this embodiment further including other elements is shown in FIG. 10.

Figure 10:
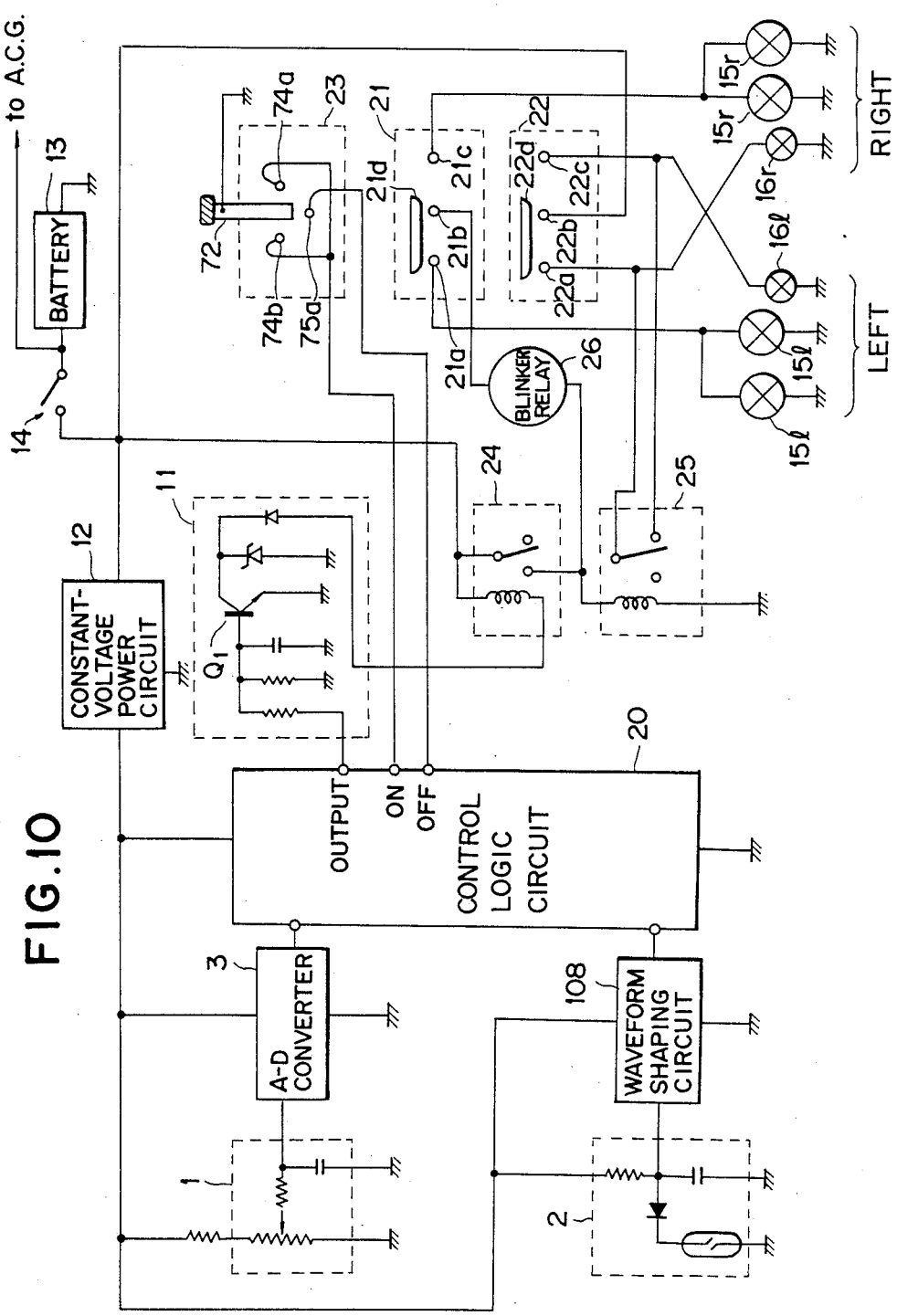
FIG. 10 is a connection diagram between the circuit of FIG. 9 is embodied by a microcomputer and a blinker system.

In FIG. 10, there are shown blinker lamps 15r and 15l connected to a control logic circuit 20 included in the portion [III] of FIG. 9 and a relay for controlling the same position lamps 16r and 16l and a relay 25 for controlling the same, as well as devices and circuits for operating such components. The control logic circuit 20 comprises a microcomputer for instance.

Reference numeral 21 denotes a one-circuit two-contact switch. A central contact 21b thereof is connected to a power source 13 through a blinker relay 26 and the turn signal control relay 24, and two other two contacts 21a and 21c are connected to the left and right blinker lamps 15l and 15r, respectively, to thereby select a blinker lamp to be operated. A switch 22 is also provided, which is a one-circuit two-contact switch, with a central contact thereof being connected to the power source 13 and two other contacts connected to the right and left position lamps 16r and 16l. The switch 22 cooperates with the position lamp control relay 25 to turn off one position lamp when a blinker is in operation. The switches 21 and 22 are interlocked with each other to turn off the position lamp on the side of the blinker which is in operation. The numeral 23 denotes a one-circuit three contact switch. An operating lever 72 of the switch 23 serves as a central contact, which is grounded. Two right and left first contacts 74a and 74b are connected to an ON terminal of the control logic circuit 20, and one second contact 75a is connected to an OFF terminal of the control logic circuit 20. The relay 24 is operated by the drive circuit 11 connected to an OUTPUT terminal of the control logic circuit 20 to connect the blinker relay 26 to the power source 13. The relay 25 is operated by operation of the relay 24 and it cooperates with the switch 22 to turn off one-side position lamp. The apparatus described hereinabove is operated in the following manner.

For operating a blinker when making a turn, the driver of the motorized cycle is required to turn the switches 21, 22 and 23 in the proper direction. The operating lever 72 of the switch 23 comes into contact with one of the first contacts 74a and 74b to connect the first contact to ground, and the resulting signal is fed to the ON terminal of the control logic circuit 20. A flip-flop circuit 10a serving as the output circuit of the control logic circuit 20 is thereby set to produce a high level voltage from the OUTPUT terminal of the control logic circuit 20, so that a transistor $Q_1$ conducts and the relay 24 operates to apply voltage to the blinker relay 26, thus causing the blinker lamp 15 to start blinking. In this case, the blinker lamp on the side selected by the switch 21 blinks and the position lamp on the same side is turned off by the action of the switch 22 and relay 25. When the driver completes the operation of the switches 21, 22 and 23, the operating lever 72 moves away from the first contact, but the output of the flip-flop circuit 10a of the control logic circuit 20 remains in the state of high level, and the switches 21 and 22 are held in the respective operated positions. The travel state of the motorized cycle after completion of the switching operation is detected by the turning angle detector 1 and travel distance detector 2, and detected signals from such detectors are fed to the control logic circuit. The signal processing in the control logic circuit is substantially the same as that previously described in connection with the turning angle center detecting circuit shown in FIG. 8 and the automatic turn signal cancelling circuit shown in FIG. 1. Because the flip-flop circuit 10a is used as the output circuit of the control logic circuit, as shown in FIG. 9, a turn signal cancelling signal is produced in the form of a low level voltage produced by the control logic circuit, whereby the transistor $Q_1$ is rendered nonconducting and the contact of the relay 24 is returned to the original position to turn off the blinker. The cancelling signal produced by the control logic circuit also functions to stop the operation of the control logic circuit, so that the apparatus reverts to its state before operation of the blinker, again ready for operation. When the blinker should be manually cancelled, the driver is required to operate the switch 23 to bring the operating lever 72 into contact with the second contact 75a. The signal thereby produced on the second contact 75a operates to reset the flip-flop circuit 10a which is the output circuit of the control logic circuit through the OFF terminal of the control logic circuit, to produce a cancelling signal.

Figure 11:
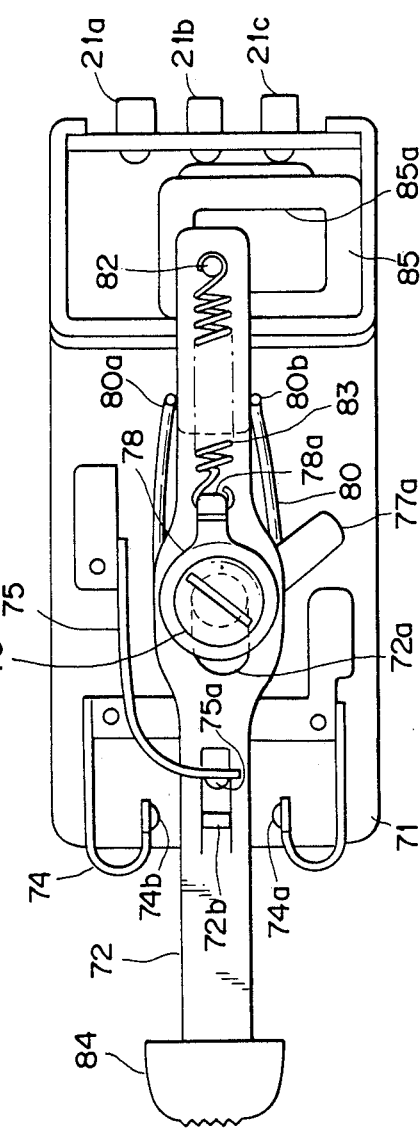
FIG. 11 is a plan view of a blinker operating switch assembly.
Figure 12:
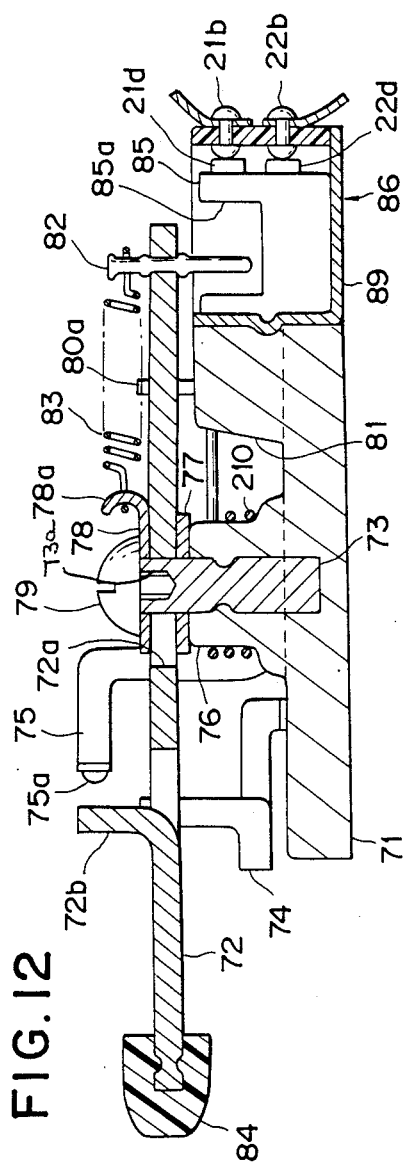
FIG. 12 is a transverse sectional view of the assembly of FIG. 11.

Referring now to FIGS. 11 and 12, there is shown a switch assembly capable of effecting the above described operation easily and effectively. This switch assembly has a base 71 formed of an insulating material and an operating lever 72 formed of a conductive material. On the base 71 is formed a cylindrical projection 76 extending upwardly in an approximately central position, and a shaft member 73 is centrally fitted in the cylindrical projection 76. A lower washer 77 provided with a wiring projection 77a is fitted on the shaft member 76, and in a position above the lower washer 77 the operating lever 72 is fitted on the shaft member 56 through a long hole 72a formed approximately centrally therein. Further fitted thereon above the operating lever 72 is an upper washer 78 provided with a projection 78a for engagement with one end of a spring 83. These members are secured to the shaft member 73 pivotably by a threaded engagement of a screw 79 with a tapped hole 73a. The long hole 72a of the operating lever 72 is so formed as to be longer in the longitudinal direction of the operating lever 72, thereby permitting the operating lever 72 to move in its longitudinal direction.

On the base 71 are further mounted contact member 74 and 75 provided with contacts 74a, 74b and a contact 75a respectively for contact with the operating lever 72 at the time of operation of the switch assembly, as well as a switch mechanism 86 adapted to be switched over by a pivotal motion of the operating lever 72, the switch mechanism 86 being constructed substantially as a slide switch.

A spring 80 is wound onto the cylindrical projection 76 and its end portions 80a and 80b are in abutment with both sides of the operating lever 72 at the right-hand portion in FIG. 11 with respect to the pivot point of the lever 72 while being restricted by a restricting projection $\theta_1$ formed on the base 71 so that the operating lever 72 is held in a neutral position as shown in FIG. 11. From the right end portion in FIG. 11 of the operating lever 72 is suspended a rod 82 in a vertically projecting manner, and a spring 83 is mounted between the upper end of the rod 82 and the projection 78a of the upper washer 78 whereby the operating lever 72 is urged to the left in its longitudinal direction in FIG. 11.

The operating lever 72, which comprises a conductive plate member, is provided at its left end portion in FIG. 11 with a knob 84 formed of a synthetic resin and is further provided with an upward projection 72b in an intermediate position between the knob 84 and the pivot point of the lever 72.

With respect to the operating lever 72 mounted on the base 71 in the manner described above there is disposed the contact member 74 having the contacts 74a and 75b capable of contacting both sides of the lever 72 in positions between the knob 84 and the pivot point of the lever, as well as the contact member 75 having the contact 75a capable of contacting the projection 72b.

On the other hand, on the end portion side of the operating lever 72 where the rod 82 is mounted there is disposed the switch mechanism 86 which comprises a slider 85 having a recess 85a engaged with the rod 82 and also having slide contacts 21d and 22d, and a case 89 which accommodates and guides the slider 85 and which is provided with six fixed contacts 21a, 21b, 21c, 22a, 22b and 22c adapted to come into contact with the slide contacts 21d and 22d.

There are two ways of operating the foregoing switch assembly, one of which involves turning the operating lever to the right and left, and the other of which involves pushing in the same lever. The operating lever, regardless of which way it is moved, is returned upon release of the pressure imposed thereon to its neutral position by virtue of the resilience of the spring. Only while the operating lever is turned to the right or left, either the contact 74a or 74b contacts the lever on either side of the lever, and only while the operating lever is pushed in, the contact 75a contacts the lever. Upon release of the operating lever, such contacts are disengaged from the lever. But the slide switch mechanism 86 is held in its previous contact state even after the operating lever returns to the neutral position because the recess 85a of the slider 85 which engages the rod 82 is large enough to provide a considerable play with respect to the rod 82.

In the above construction, the operating lever 72 and the contact members 74 and 75 constitute the switch shown in FIG. 10, while the contacts 21a, 21b, 21c and the contacts 22a, 22b, 22c constitute the switches 1 and 22 shown in FIG. 10, respectively. As will be understood from the above description, this switch assembly has all of the functions for operating the automatic turn signal cancelling apparatus of the present invention and is compactly constructed, thereby permitting the motorized cycle driver to perform the required operation easily and with certainty.

It will be understood that the present invention is not limited to the embodiments described hereinabove and that various changes and modifications may be made therein without departing from the gist of the invention.

According to the present invention, as will be appreciated from the foregoing description, the following effects can be obtained.

Because there are provided two references by the circuit arrangement, and whether the motorized vehicle is making a turn or not is judged by combination of such references, it is possible to correctly distinguish a turn signal from a mere noise signal caused by fluctuation of the handlebar, thereby permitting a further improvement in performance of the handlebar turning angle detection type automatic turn signal cancelling apparatus. More particularly, because the accumulated value of handlebar turning angles when making a turn is obtained by accumulating a value of handlebar turning angle at every certain distance by utilization of travel distance, the characteristic of the automatic cancelling operation fully matches that of the turning motion and the cancellation of turn signal is effected accurately automatically, and the operability in driving the motorized cycle can be improved without imposing a mental burden on the driver.

Moreover, because a handlebar turning angle at the longest stable travel distance during travelling of a motorized cycle or like vehicle is obtained as a center value of turning angle by utilization of an electrical circuit, it is possible to obtain a highly accurate and stable turning angle center. Additionally, application of the present invention to an automatic turn signal cancelling apparatus or the like makes it possible to ensure a stable and exact operation of the apparatus because the turning angle center can be established correctly according to the particular vehicles.

According to the present invention, moreover, to cope with a complicated circuit configuration of the automatic turn signal cancelling apparatus whose operation principle is relatively simple, the circuit configuration is arranged so as to be capable of handling digital signals and being programmed within a microcomputer for signal processing by means of software, whereby it is made possible to attain simplification and reduction in size of the circuit configuration as well as reduction of the manufacturing cost.

Furthermore, by the provision of a switch assembly suitable for operating the automatic turn signal cancelling apparatus described hereinabove, it is made possible to attain an easy and accurate direction indicating operation.

What is claimed is:

1. An automatic turn signal cancelling apparatus for a motorized cycle, comprising:
    a turning angle detector for detecting an handlebar turning angle when the motorized cycle makes a turn;
    a distance detector for detecting a travel distance and producing a pulse output;
    means, operatively connected with said turning angle detector and said distance detector, for accumulating the output of said turning angle detector in synchronism with the output pulse from said distance detector; and
    logical arithmetic means, operatively connected with said turning angle detector and said accumulation means, for deciding upon cancellation of a turn signal on the basis of a combination of an output signal from said turning angle detector and that from said accumulation means.

2. An automatic turn signal cancelling apparatus according to claim 1, wherein:
    said logical arithmetic means is operative to maintain said accumulation means in a reset state when said handlebar turning angle is below a first preset value and decide said turn signal cancellation in case said handlebar turning angle becomes smaller than said first preset value when the output of said accumulation means exceeds a second preset value.

3. A turning angle center detecting device for an automatic turn signal cancelling apparatus in a motorized cycle, comprising:

a turning angle detector for detecting a handlebar turning angle;

a distance detector for detecting a travel distance; and means, operatively connected with said turning angle detector and said distance detector, for storing as a turning angle center a handlebar turning angle obtained when the motorized cycle is travelling at a distance exceeding a reference distance value while maintaining changes of said handlebar turning angle within a preset range.

4. A turning angle center detecting device for an automatic turn signal cancelling apparatus according to claim 3, wherein:

said reference distance value changes according to travel states and becomes larger as the travel distance becomes longer.

5. An automatic turn signal cancelling apparatus for a motorized cycle, comprising:

a turning angle detector for detecting a handlebar turning angle;

a distance detector for detecting a travel distance and producing a pulse output;

means, operatively connected with said turning angle detector and said distance detector, for storing as a turning angle center a handlebar turning angle obtained when the motorized cycle is travelling at a distance exceeding a reference value while maintaining changes of said handlebar turning angle within a preset range; and means, operatively connected with said storing means, for cancelling a turn signal by electrically processing at the time of turning of the motorized cycle a signal provided from said turning angle detector, a signal provided from said distance detector and a signal relating to said turning angle center stored in said storing means, and discriminating the end of the turn on the basis of a state of change in the turning angle.

6. An automatic turn signal cancelling apparatus according to claim 5, wherein:

said reference value of travel distance changes according to travel states and becomes larger as the travel distance becomes longer;

said means for cancelling a turn signal includes an arithmetic circuit for calculating an actual turning angle on the basis of both the output of said turning angle detector and that from said storing means, means for accumulating the output of said arithmetic circuit in synchronism with the output pulse from said distance detector, and logical arithmetic means for producing a turn signal cancelling signal on the basis of a combination of an output signal from said arithmetic circuit and that from said accumulation means; and said logical arithmetic means is operative to maintain said accumulation means in a reset state when a handlebar turning angle determined on the basis of the output signal from said arithmetic circuit is below a first preset value and to produce said turn signal cancelling signal in case said handlebar turning angle becomes smaller than said first preset value when the output of said accumulation means exceeds a second preset value.

7. An automatic turn signal cancelling apparatus according to claim 6, wherein:

said storing means, said arithmetic circuit, said accumulation means and said logical arithmetic means are substantially programmed within a microcomputer, and said apparatus further includes switch means for selecting a blinker to be turned on and operating said microcomputer, relays for controlling the operation of blinker lamps and position lamps, and a drive circuit adapted to be operated by said microcomputer to operate said relays.

8. An automatic turn signal cancelling apparatus according to claim 7, wherein said switch means comprises a direction indicating switch assembly, said switch assembly comprising:

a base;

a shaft member implanted in said base;

an operating lever fitted on said shaft member;

spring means for urging said operating lever to a neutral position;

first and second contact members mounted on said base and having contacts for contact with said operating lever at the time of operation of said operating lever; and a switch mechanism mounted on said base and being switchable according to a pivotal motion of said operating lever, said switch mechanism substantially comprising a slide switch, wherein said operating lever is returned to said neutral position by said spring means when said operating lever is released after operation; and said contacts of said contact members are disengaged from said operating lever, while said switch mechanism is held in the same state of connection as that during operation of said operating lever.

* * * * *

UNITED STATES PATENT AND TRADEMARK OFFICE
CERTIFICATE OF CORRECTION

PATENT NO. : 4,962,366                                    Page 1 of 2

DATED     : OCTOBER 9, 1990

INVENTOR(S) : KAORU HATANAKA, YUKIO MIYAMARU, AND SHIGEO KAWADA

It is certified that error appears in the above-identified patent and that said Letters Patent is hereby corrected as shown below:

Column 3, line 40, change "Vcc" to -- + Vcc --;
         line 63, change "Provided, however" to --However--;
         line 64, change "so constructed" to -- constructed so--;
         line 66, change "so constructed" to --constructed so--.
Column 4, line 12, after "by" insert --an actual--;
         line 23, change "0" to --$\theta$--;
         line 36, change "B FIG. 2." to --B in Figure 2.--;
         line 44, change "angle 8." to --angle $\theta$.--;
         line 44, change "mark" to --marks--;
         line 56, change "FIG. 2)" to --Figure 2)--.
Column 5, line 12, change "turn" to --turning--.
Column 6, line 40, change "output-" to --output--;
         line 55, change "03" to --$\theta_3$--;
         line 56, change "$|\theta - \theta_3| >,$" to --$|\theta - \theta_3| \leq \epsilon_1$,--.
Column 7, line 12, change "04," to --$\theta_4$,--;
         line 14, change "ne" to --new--;
         line 59, change "changed" to --changed.--.
Column 8, line 14, change "latter" to --latter.--;
         line 21, change "15r" to --15r--;
         line 36, after "circuit" insert a period.
Column 9, line 51, delete "1";
         line 68, after "circuit" insert --4--.
Column 10, line 29, change "mentioned" to --described--;
Column 10, line 30, change "turnIng" to --turning--.
Column 11, line 32, change "three contact" to --three-contact--.
Column 12, line 63, change "$\theta_1$" to --81--.
Column 13, line 12, change "75b" to --74b--;
         line 46, change "1" to --21--.

UNITED STATES PATENT AND TRADEMARK OFFICE
CERTIFICATE OF CORRECTION

PATENT NO. : 4,962,366

DATED : October 9, 1990

INVENTOR(S) : Kaoru Hatanaka, Yukio Miyamaru, and Shigeo Kawada

It is certified that error appears in the above-identified patent and that said Letters Patent is hereby corrected as shown below:

Column 14, line 41 (Claim 1, line ), change "an" to --a--.

Signed and Sealed this

Twenty-first Day of April, 1992

Attest:

HARRY F. MANBECK, JR.

Attesting Officer  Commissioner of Patents and Trademarks